US007750952B2

(12) United States Patent
Yoneda

(10) Patent No.: US 7,750,952 B2
(45) Date of Patent: Jul. 6, 2010

(54) IMAGE DATA RECORDING OR STORING APPARATUS, COMPUTER PROGRAM FOR CONTROLLING SAID APPARATUS, AND METHOD FOR INITIALIZING AREAS ON A RECORDING MEDIUM

(75) Inventor: Shigeru Yoneda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 11/135,277

(22) Filed: May 24, 2005

(65) Prior Publication Data

US 2005/0276183 A1  Dec. 15, 2005

(30) Foreign Application Priority Data

Jun. 10, 2004  (JP)  ............................. 2004-172785

(51) Int. Cl.
*H04N 5/76* (2006.01)
*H04N 5/222* (2006.01)

(52) U.S. Cl. .............................. 348/231.2; 348/333.02; 369/47.1; 711/153

(58) Field of Classification Search . 348/231.1–231.99; 711/153
See application file for complete search history.

(56) References Cited

U.S. PATENT DOCUMENTS 6,298,427 B1 * 10/2001 Beelitz ........................ 711/173
6,330,653 B1 * 12/2001 Murray et al. ............... 711/173
6,988,174 B1 *  1/2006 Yamashita ................... 711/153
2004/0268110 A1 * 12/2004 Oomori .......................... 713/1
2005/0036034 A1 *  2/2005 Rea et al. .................. 348/207.1
2005/0154819 A1 *  7/2005 Conley et al. ................ 711/103
2005/0259163 A1 * 11/2005 Tsujii et al. ............... 348/231.2

FOREIGN PATENT DOCUMENTS

JP       2001-016491       *  1/2001

OTHER PUBLICATIONS

Windows XP Proffesional Format Functions ( Released Oct. 25, 2001).*
"PartitionMagic 6.0" Japanese version, DOS/V Power Report, Japan, Kabusiki Kaisha Impress, Mar. 1, 2001, vol. 11, No. 3, p. 222, and partial English-language translation consisting of a translation of left-hand column, line 12 to middle column, line 8 of p. 222.
"Basic lecture of add-on and change of a Hard Disk, Complete support from mounting to data movement, must-see for a beginnerII," PCfan, Japan, Mainichi Communications, Dec. 1, 2002, vol. 9 No. 33, pp. 118-123, and partial English-language translation consisting of translation of pp. 120 and 121.

* cited by examiner

*Primary Examiner*—Sinh Tran
*Assistant Examiner*—Hung H Lam
(74) *Attorney, Agent, or Firm*—Fitzpatrick, Cella, Harper & Scinto

(57) ABSTRACT

An image data recording apparatus includes an area producing device producing a plurality of areas on a recording medium, an initialization device initializing the areas produced by the area producing device in accordance with desired forms, an area production designating device causing a user to designate a number of the areas produced by the area producing device and a recording capacity of each of the areas, and a format designating device causing the user to designate a kind of a format of each of the areas produced by the area producing device.

8 Claims, 5 Drawing Sheets

IMAGE DATA RECORDING OR STORING APPARATUS, COMPUTER PROGRAM FOR CONTROLLING SAID APPARATUS, AND METHOD FOR INITIALIZING AREAS ON A RECORDING MEDIUM

BACKGROUND OF THE INVENTION

1. Field of the Invention

The present invention relates to an image data recording apparatus, an initialization method of a recording medium by the image data recording apparatus, and a computer program. According to the present invention, a user is let to specify the number of areas to be produced, the recording capacity of each of those areas, and the kind of the format of each of those areas, thereby initializing the specified areas in desired forms.

Specifically, the present invention relates to an image data recording apparatus such as a digital camera recording photographed digital moving image data and still image data on a recording medium, an initialization method of a recording medium by the image data recording apparatus, and a computer program.

2. Description of Related Art

In recent years, the enlargement of the capacity of a detachable recording medium such as a memory card used for a digital camera and the like has been progressing. It is considerable that, when the enlargement of the capacity of a storage medium has progressed, all of the recording capacity of a memory card cannot be used in case that the memory card is in conformity with the formats of File Allocation Table (FAT) 12 and FAT 16, which are generally used now.

There is FAT 32 as a format capable of treating mass capacity data. However, it is considerable that, when a storage medium is formatted in accordance with FAT 32 for treating the whole recording capacity of a memory card, it becomes impossible to use the storage medium by an existing digital camera.

Accordingly, a method of enabling the use of the whole recording capacity of a memory card while maintaining compatibility with the existing digital camera has been proposed. This method uses a technique of dividing a recording medium into a plurality of areas (partitions) to format each partition in accordance with a format different from each other, which technique is generally performed to a hard disc built in a personal computer and the like. Using this technique, a top partition is formatted in accordance with FAT 12 or FAT 16, which the existing digital camera can recognize, and the other partitions are formatted in accordance with a format such as FAT 32 capable of treating a mass capacity. Consequently, several types of formats are intermingled in one storage medium.

However, in case of adopting this method, it is expectable that a general user would be confused in combination of the recording capacity and the format form of each partition at the initialization of the recording medium.

SUMMARY OF THE INVENTION

The present invention is for solving the problem mentioned above, and aims to enable the initialization according to a use without making a user be confused in case of producing a plurality of partitions on a recording medium to intermingle a plurality of kinds of formats thereon.

In order to attain such an object, according to a scope of the present invention, an image data recording apparatus of the present invention comprises:

an area producing device, which produces a plurality of areas on a recording medium;

an initialization device, which produces the areas produced by the area producing device in accordance with desired forms;

an area production designating device, which causes a user to designate a number of the areas produced by the area producing device and a recording capacity of each of the areas; and a format designating device, which causes the user to designate a kind of a format of each of the areas produced by the area producing device.

BRIEF DESCRIPTION OF THE DRAWINGS

The object of the present invention described above will be apparent from the following drawings and detailed descriptions based on the drawings, in which.

DETAILED DESCRIPTION OF THE PREFERRED EMBODIMENTS

Hereinafter, an embodiment of the present invention will be described with reference to the drawings.

Figure 1:
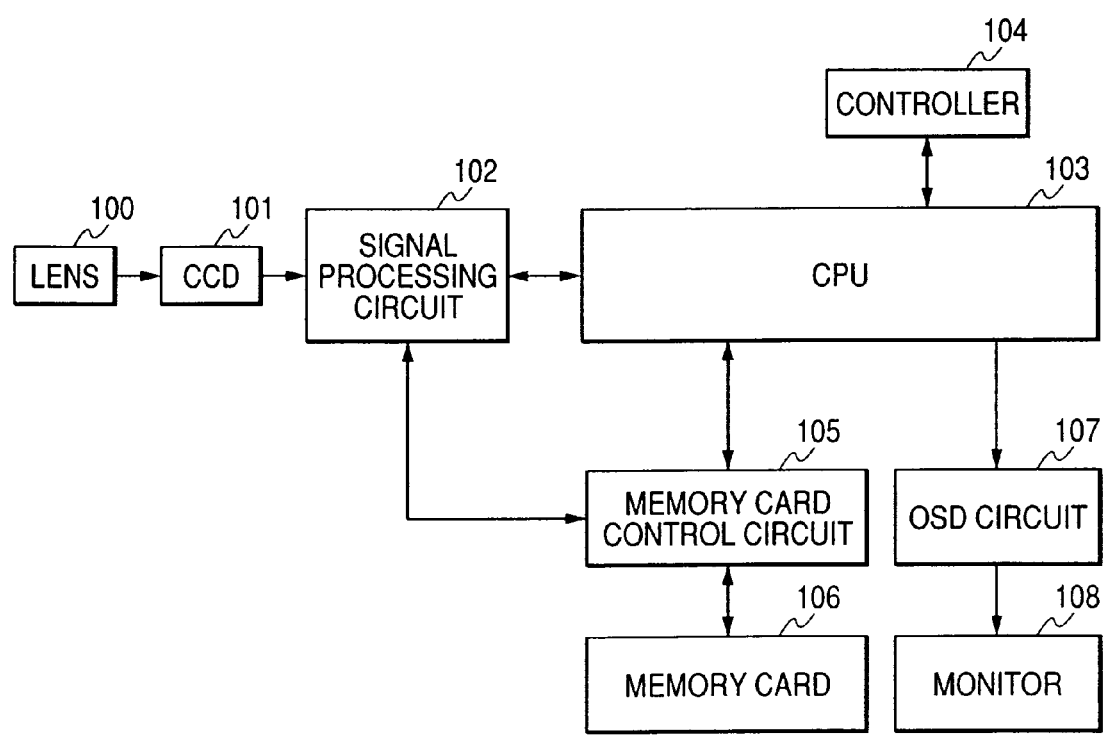
FIG. 1 is a view showing the schematic configuration of a digital camera to which the present invention is applied.

Hereinafter, with reference to the attached drawings, a suitable embodiment of the present invention will be described. FIG. 1 is a view showing the schematic configuration of a digital camera to which the present invention is applied. Reference numeral 100 denotes a lens. Reference numeral 101 denotes a CCD converting an image entered through the lens 100 to an electric signal. Reference numeral 102 denotes a signal processing circuit converting the signal obtained from the CCD 101 to desired image data.

Reference numeral 103 denotes a CPU controlling the whole system. Reference numeral 104 denotes a controller for inputting an operation command to the CPU 103. A four-way operational key, a determination button and the like for a user to operate the digital camera are arranged on the controller 104. Reference numeral 105 denotes a memory card control circuit. The memory card control circuit 105 controls a communication protocol with a memory card 106, and accesses the memory card 106 in accordance with the control of the CPU 103 to perform the writing and the reading of data.

The reference numeral 106 denotes the memory card detachable to a memory cartridge. Reference numeral 107 denotes an on-screen display (OSD) circuit. The OSD circuit 107 displays a menu using a character and a picture, and the like on a monitor 108 in accordance with the control of the CPU 103, and provides a user interface together with the controller 104. The reference numeral 108 denotes the monitor.

Figure 2:
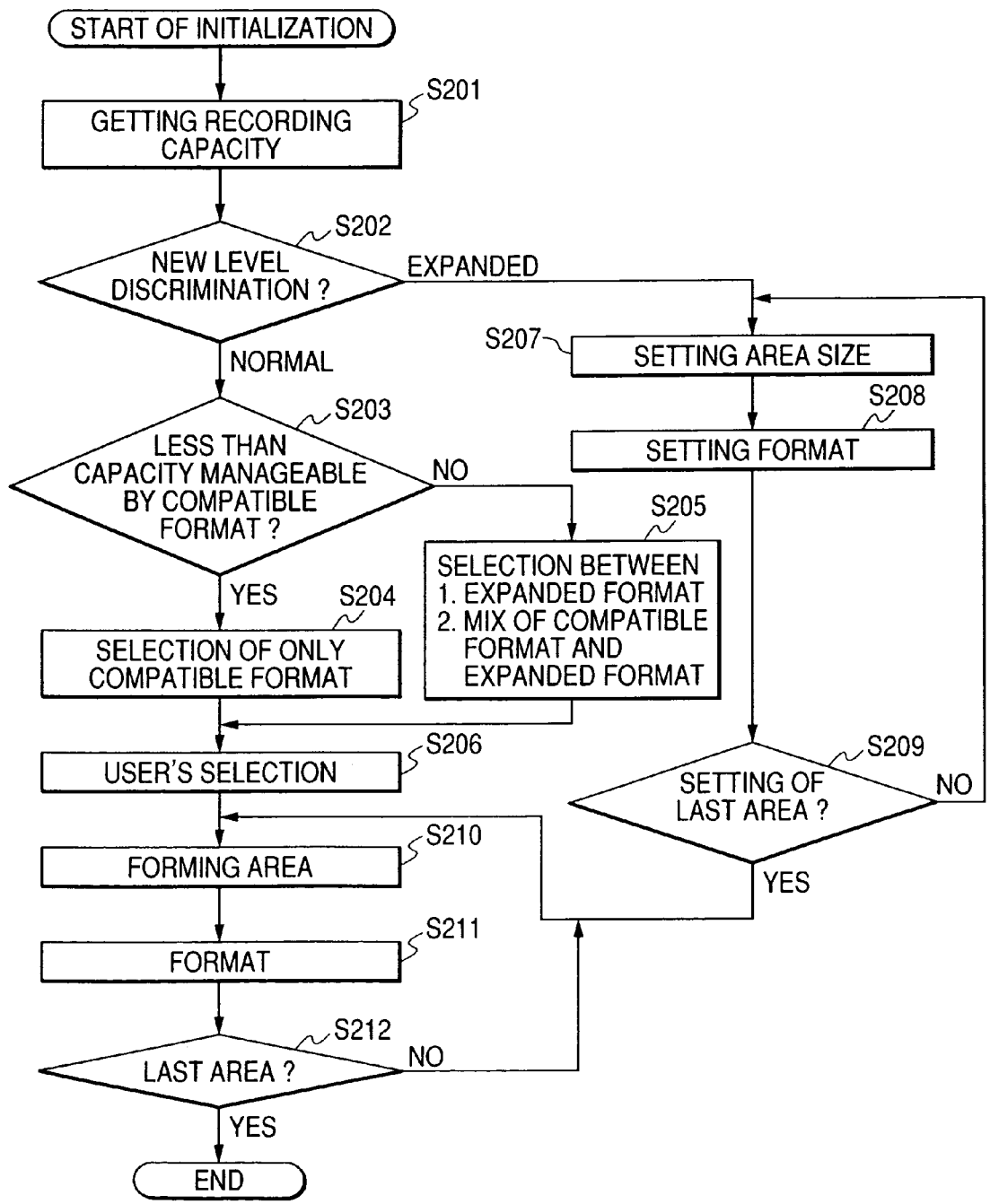
FIG. 2 is a flowchart showing a processing operation at the time of initializing a memory card.

FIG. 2 is a flowchart showing a processing operation of the CPU 103 at the time of initializing the memory card 106. When the CPU 103 receives a user's operation from the controller 104 and the CPU 103 starts the initialization processing of the memory card 106, the CPU 103 controls the memory card control circuit 105 to obtain the recording capacity of the memory card 106 (Step S201).

Next, the CPU 103 discriminates the level of the degree of the difficulty of the menu which the user has chosen and set from two selection items of "normal" and "expansion" in advance (Step S202).

When the level of the degree of the difficulty of the menu is discriminated to be "normal" at Step S202, the CPU 103 discriminates whether the recording capacity of the memory card 106 is less than a recording capacity manageable by a format compatible with the format of the existing digital camera such as FAT 12 or FAT 16 or not (Step S203).

When the recording capacity of the memory card 106 is less than the recording capacity manageable by, for example, FAT 16 at Step S203, the CPU 103 generates only a selection item for initializing the whole in conformity with FAT 16 (Step S204). Although the name "FAT 16" may be used, as it is, as a name of the selection item shown to the user in that case, it is also possible to avoid the technical term and use a name abstracting a use such as a "compatible format."

On the other hand, when the recording capacity of the memory card 106 exceeds the recording capacity manageable by the format compatible with the format of the existing digital camera such as FAT 12 or FAT 16 at Step S203, the processing of the CPU 103 proceeds to Step S205. At Step S205, two selection items of formats, a selection item 1 and a selection item 2, are prepared as an initialization candidate list.

Here, for example, the selection item 1 is a selection item initializing the whole in conformity with an expanded format such as FAT 32. On the other hand, the selection item 2 is a selection item selecting the interminglement of the compatible and expansion intermingling format in which the whole is divided into two partitions, a first partition securing the maximum recording capacitance manageable by FAT 16 and being initialized by FAT 16, and the other partition being initialized by FAT 32.

When the preparation of the selection items has been completed, the CPU 103 controls the OSD circuit 107 to make the OSD circuit 107 display the initialization candidate list on the monitor 108 to causes the user to select a selection item (Step S206).

On the other hand, when the level of the degree of the difficulty of the menu is discriminated to be "expansion" at Step S202, the user sets a size (recording capacity) of the partition assigned from the top of the recording capacity of the memory card 106 (Step S207). Moreover, the user sets the format form of the partition (Step S208). After that, when the setting is made to the full recording capacity of the memory card 106 or the user instructes the termination of the setting, the CPU judges whether the setting has been made up to the last partition or not (Step S209). When the setting has not been made up to the last partition yet, the CPU 103 repeats processing of returning to Step S207 to set the size of the succeeding partition and then set the format form of the succeeding partition at Step S208.

When the recording capacity and the kind of the format of each partition have been set, each partition is produced to have a designated recording capacity in the order from the top (Step S210), and the CPU 103 formats each partition in conformity with the designated form (Step S211). After that, the CPU 103 judges whether the processing has been completed up to the last partition among the set ones or not (Step S212). When the processing has not been completed yet, the CPU 103 repeats processing of returning to Step S210 to produce a partition of a successively designated recording capacity and then format the partition at Step S211.

When it is judged that the processing has been completed up to the last partition at Step S212, all processing is terminated.

Figure 3:
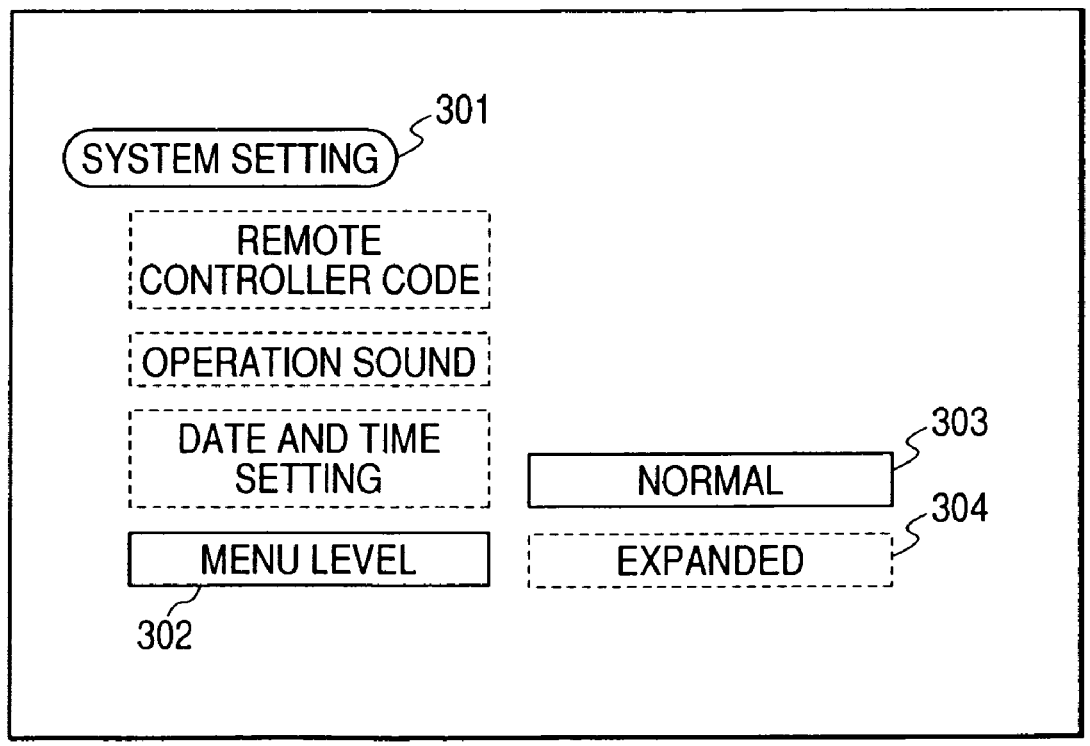
FIG. 3 is a view showing an example of a displayed screen of a system setting menu.

FIG. 3 shows a state in which a system setting menu 301 is displayed on the monitor 108 by the OSD circuit 107. Although the level of the degree of the difficulty of the menu is discriminated at Step S202 of FIG. 2, since the level of the degree of the difficulty of the menu is applicable not only especially to the initialization of the memory card 106 but also to a change of the other menus, the level of the degree of the difficulty of the menu can be effectively utilized by making it possible to set the level of the degree of the difficulty of the menu independently of the menu related to the memory card 106.

When the user selects a menu level item 302 in FIG. 3, the CPU 103 displays a selection item 303 for setting the level of the degree of the difficulty of the menu to be the "normal", and a selection item 304 for selecting the level of the degree of the difficulty of the menu to be the "expansion". Then, the user selects one item among them to set. In addition, movements and determinations of the menu items can be performed with the button arranged on the controller 104 or the like. Dashed line frames show non-selected items, and solid line frames show selected items in FIG. 3. FIG. 3 shows a state in which the "normal" level is selected. In addition, although the level of the degree of the difficulty of the menu is displayed as one item of the system setting menu 301 in the example of FIG. 3, it is also possible to put the level of the degree of the difficulty of the menu in the items other than the system setting menu 301. Moreover, it is also possible to provide a special key on the controller 104 and display a user interface enabling the direct selection of the level of the degree of difficulty of the menu with the key.

Figure 4A:
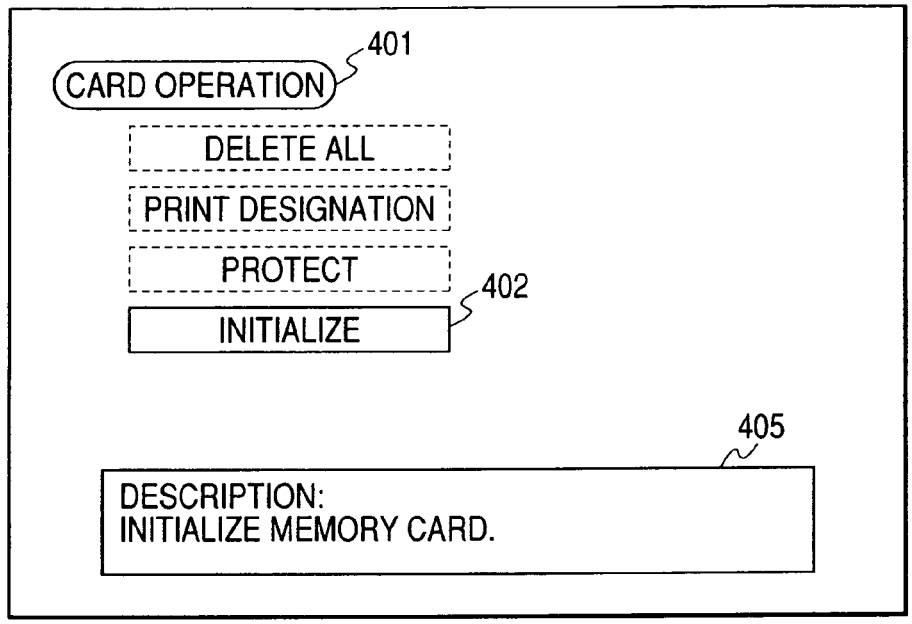
FIGS. 4A and 4B are views showing examples of a selection screen of an initialization method in the case where the level of the degree of difficulty of a menu is set to be "normal"
Figure 4B:
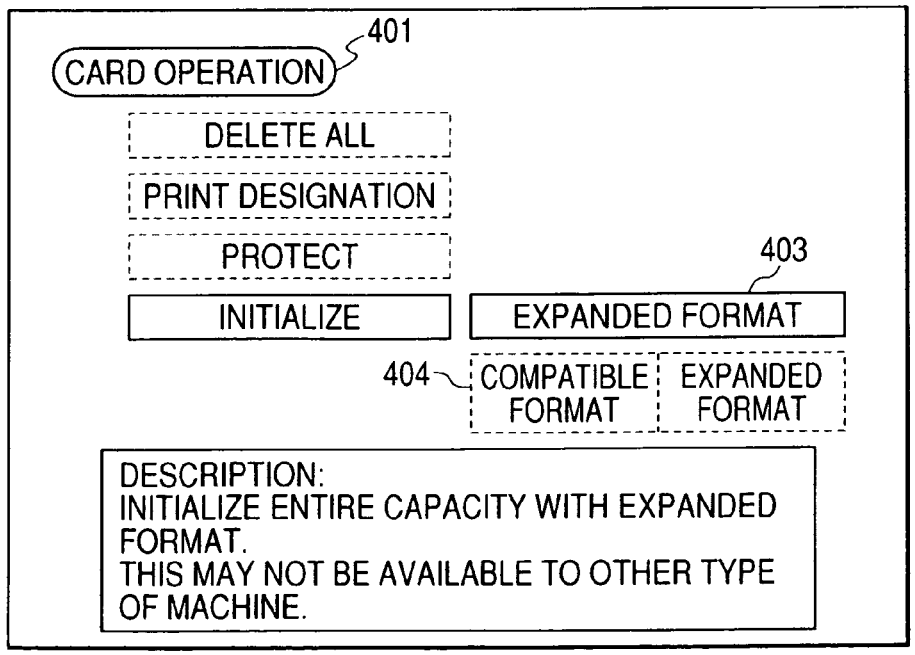

FIGS. 4A and 4B show selection screens of the initialization method when the level of the degree of the difficulty of the menu is set as the "normal." When an initialization item 402 of a card operation menu 401 is selected in FIG. 4A in the case where the level of the degree of the difficulty of the menu is beforehand set to be the "normal" using the user interface shown in FIG. 3, the processing of the CPU 103 proceeds to the processing of performing the "normal" judgment at Step S202 of FIG. 2.

The processing of the CPU 103 proceeds to Step S205 of FIG. 2 in a case of using a memory card having a mass capacity which cannot be managed by a format compatible with the existing digital camera such as FAT 16. In this case, the selection screen is one shown in FIG. 4B. This screen shows, as the selection items, an expanded format item 403 indicating the initialization by a format such as FAT 32 capable of treating a mass capacity so that the entire recording capacity of the memory card 106 is used one partition, and an item 404 indicating the interminglement of a compatible format and an expansion format, where a top partition is formatted by FAT 16 and the residual partition is formatted by FAT 32, after dividing the entire recording capacity of the memory card 106 into the two partitions of the top partition and the residual partition.

Although the two selection items of the item 403 and the item 404 described above are generated and displayed as the initialization candidate list in the present embodiment, the present invention is not limited to the display mode of the selection items. In addition, for example, a selection item for securing only a partition of the maximum area manageable by FAT 16, and for leaving the remainder as it is may be displayed. Moreover, a selection item may be displayed in which, even if two partitions are produced, the ratio of each recording capacity is calculated from the entire recording capacity in conformity with a fixed rule, and the entire capacity is divided at the ratio to be formatted by FAT 16 and FAT 32, respectively. Moreover, a selection item for producing many partitions of recording capacity manageable by FAT 16 to have two or more partitions all formatted in conformity with FAT 16, and a selection item for dividing an area into a plurality of partitions even for the format such as FAT 32 capable of treating a mass capacity may be also displayed as candidates.

In addition, in FIG. 4B, the item 403 is selected and a description of the initialization method is displayed in a description column 405. The contents of the description column 405 are changed to be displayed according to the selected item, and when the item 404 is selected, the contents display the description of the initialization method.

Figure 5:
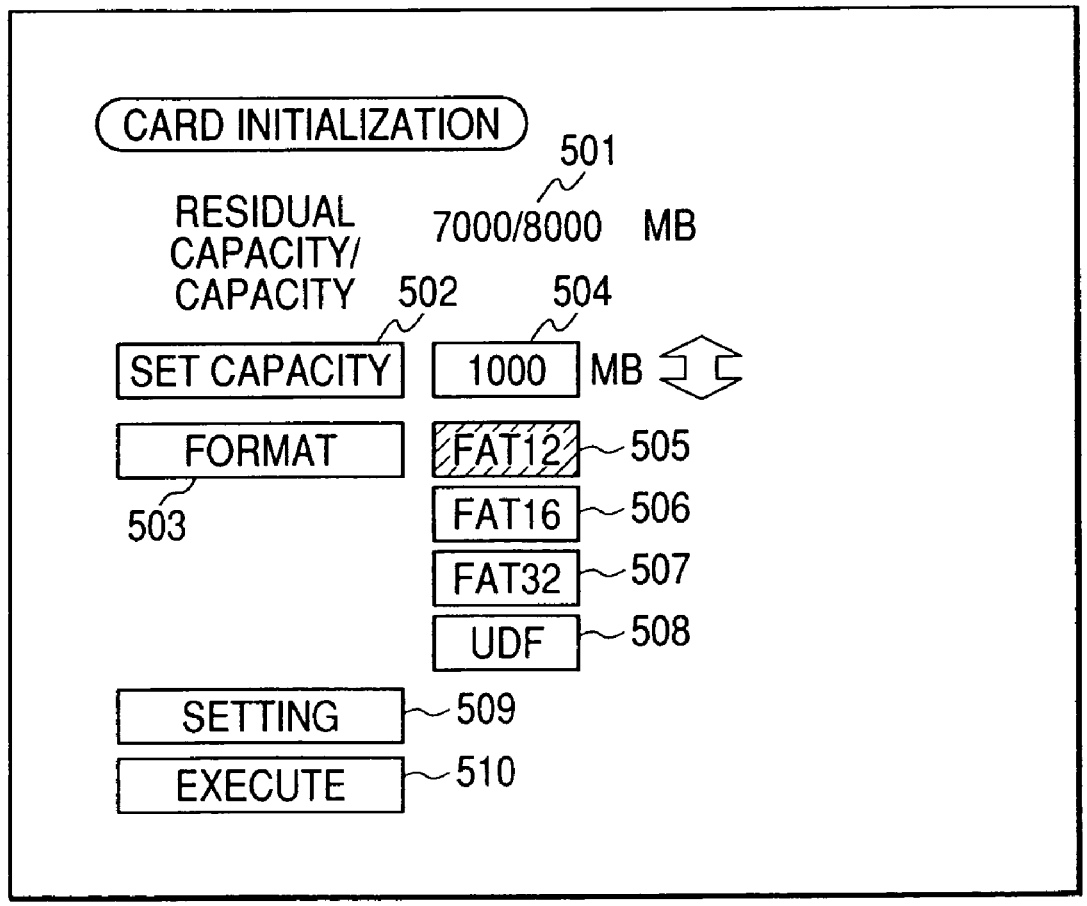
FIG. 5 is a view showing an example of the selection screen of the initialization method in the case where the level of the degree of difficulty of the menu is set to be "expansion".

FIG. 5 shows the selection screen of the initialization method when the level of the degree of the difficulty of the menu is set as the "extension." When the level of the degree of the difficulty of the menu is beforehand set as the "extension" by using the user interface shown in FIG. 3, if the initialization item 402 of the card operation menu 401 is selected in FIG. 4A, the screen is changed as shown in FIG. 5, and a user interface which can designate the more detailed memory card initialization method is displayed.

Here, a set capacity item 502 is selected first. When the user performs an operation in the right direction with the controller 104 from that state, a capacity setting item 504 is selected. By increasing or decreasing the numerical value by an operation in the vertical direction in this state, the size (recording capacity) of the partition to be produced can be designated.

Next, the selection returns from the position of the capacity setting item 504 to the setting capacity item 502 by a leftward operation, and a format item 503 is selected by a further downward operation. Then, the selection can move to an item 505 indicating FAT 12 by a right operation, and the other items 506-508 can be selected by vertical operations. In addition, letters UDF in FIG. 5 denotes Universal Disk Format.

Moreover, it is also possible to display an item which cannot be set, by changing the color thereof like the item 505 in FIG. 5 in order to show the state which indicate it is impossible to be selected, in accordance with the value of the capacity setting item 504 at the time of selecting a format method. Moreover, it is also possible to make it impossible to select by the vertical operations the position of the item in the state which indicates that it is impossible to be selected.

When a setting item 509 is selected by a similar directional operation and a determination operation is performed after setting the recording capacity and the format method of a partition to be produced, one area is set, and the display of a column 501 displaying a residual capacity is changed by re-calculating a residual capacity which has not been set to the whole capacity.

The recording capacity and the format form of the next partition are selected by a similar procedure, and it is possible to repeatedly set the partitions by the number of the desired partitions until there are no residual capacities. When an execution item 510 is selected and a determination operation is performed at a step at which all of the settings of each area have finished, the memory card 106 is actually initialized based on the set information.

As described above, according to the present embodiment, in the case where a plurality of partitions are produced on a recording medium and a plurality of kinds of formats are intermingled, the optimal initialization method is realized according to a user's use situation. Consequently, the initialization according to a use can be performed without confusing a user.

Other Embodiments

In addition, it is needless to say that the object of the present invention can be achieved also by supplying a storage medium recording the program codes of the software realizing the functions of the embodiment described above to a system or an apparatus, and by making a computer (a CPU or a MPU) of the system or the apparatus read the program codes stored in the storage medium to execute it.

In this case, the program codes read from the storage medium realizes the function of the embodiment described above by themselves, and the program codes themselves and the storage medium storing the program codes constitute the present invention.

As the storage medium for supplying the program codes, for example, a flexible disk, a hard disk, an optical disc, a magneto-optical disc, a CD-ROM, a CD-R, a magnetic tape, a non-volatile memory card, a ROM and the like can be used.

Moreover, it is needless to say that the present invention includes also a case where the not only functions of the embodiment described above are realized by the execution of the read program codes with the computer, but also an OS (a basic system or an operating system) working on the computer or the like executes a part or the whole of the actual processing based on the instructions of the program codes to realize the functions of the embodiment described above by the processing.

Furthermore, it is needless to say that the present invention includes a case where, after the program codes read from the storage medium has been written in a memory provided to a function enhancement board inserted in the computer or a function enhancement unit connected to the computer, the CPU or the like provided in the function enhancement board or the function enhancement unit executes a part or the whole of the actual processing based on the instructions of the program codes, and the functions of the embodiment described above are realized by the processing.

In the above, although the present invention has been described based on the preferable embodiments, the present invention is not limited to the embodiments described above, and various changes and modifications can be preformed within the scope of the claims.

This application claims priority from Japanese Patent Application No. 2004-172785 filed Jun. 10, 2004, which is hereby incorporated by reference herein.

What is claimed is:

1. A camera comprising:
   a designating device, which selects an initialization process in an initialization candidate list including candidates of kinds of formats of the respective areas, in response to user input;
   an area producing device, which produces a plurality of areas on a recording medium in accordance with the initialization process selected with the designating device;
   an initialization device, which initializes the areas produced by the area producing device in accordance with the initialization process selected with the designating device; and
   a detecting device, which detects a recording capacity of the recording medium; and
   an initialization candidate list generating device, which generates the initialization candidate list to change the candidates in accordance with a result of detection by the detecting device so that the generated initialization candidate list includes a kind of a predetermined format in the candidates if the detecting device detects that the recording capacity of the recording medium is a predetermined value or more and the generated initialization candidate list does not include the kind of the predetermined format in the candidates if the detecting device detects that the recording capacity of the recording medium is smaller than the predetermined value.

2. A camera according to claim 1, further comprising a display control device, which displays, on a display device, a selection screen for selecting the initialization process by the designating device.

3. A camera according to claim 2, wherein the display control device displays the candidates of the kinds of formats included in the initialization candidate list generated by the initialization candidate list generation device.

4. A control method of a camera, comprising the steps of:
   selecting an initialization process in an initialization candidate list including candidates of kinds of formats of the respective areas, in response to user input;
   producing a plurality of areas on a recording medium in accordance with the initialization process selected in the selecting step;
   initializing the areas produced in the area producing step in accordance with the initialization process selected in the selecting step; and
   detecting a recording capacity of the recording medium; and
   generating the initialization candidate list to change the candidates in accordance with a result of detection by the detecting step so that the generated initialization candidate list includes a kind of a predetermined format in the candidates if the detecting step detects that the recording capacity of the recording medium is a predetermined value or more and the generated initialization candidate list does not include the kind of the predetermined format in the candidates if the detecting step detects that the recording capacity of the recording medium is smaller than the predetermined value.

5. A non-transitory computer-readable recording medium recording thereon a computer program comprising a program code for causing a computer to execute a control method of a camera, the control method comprising the steps of:
   selecting an initialization process in an initialization candidate list including candidates of kinds of formats of the respective areas, in response to user input;
   producing a plurality of areas on a recording medium on which image data is recordable in accordance with the initialization process selected in the selecting step;
   initializing the areas produced in the area producing step in accordance with the initialization process selected in the selecting step; and
   detecting a recording capacity of the recording medium; and
   generating the initialization candidate list to change the candidates in accordance with a result of detection by the detecting step so that the generated initialization candidate list includes a kind of a predetermined format in the candidates if the detecting step detects that the recording capacity of the recording medium is a predetermined value or more and the generated initialization candidate list does not include the kind of the predetermined format in the candidates if the detecting step detects that the recording capacity of the recording medium is smaller than the predetermined value.

6. A camera according to claim 1, wherein the initialization candidate list is composed of combinations of numbers of the areas to be produced on a recording medium and recording capacity thereof.

7. A control method of a camera according to claim 4, wherein the initialization candidate list is composed of combinations of numbers of the areas to be produced on a recording medium and recording capacity thereof.

8. A non-transitory computer readable recording medium according to claim 5, wherein the initialization candidate list is composed of combinations of numbers of the areas to be produced on a recording medium and recording capacity thereof.

* * * * *